April 18, 1961    C. O. VAUGHN    2,980,102
FOOD FLAVORING CARTRIDGE
Filed Aug. 4, 1954

INVENTOR:
Charles O. Vaughn,

BY Cushman, Darby & Cushman
ATTORNEYS.

United States Patent Office 2,980,102
Patented Apr. 18, 1961

2,980,102

FOOD FLAVORING CARTRIDGE

Charles O. Vaughn, Dayton, Tenn., assignor to Hunt Heater Corporation, Nashville, Tenn., a corporation of Tennessee Filed Aug. 4, 1954, Ser. No. 447,772

1 Claim. (Cl. 126—59.5)

This invention relates to an article for producing food flavoring smoke within a cooking chamber.

More particularly, this invention relates to a food flavoring cartridge which may be introduced into the high heat zone of a cooking oven and which contains an aromatic smoke producing material which will oxidize at a low speed and which will produce a large amount of food flavoring smoke for a protracted period.

The process of barbecuing meat generally involves cooking meat in the presence of smoke and vapor produced by the combustion of certain types of wood. Wood used for this purpose is selected for its ability to yield, upon combustion, smoke and vapor containing substances which impart a delectable and very highly desired flavor to the meat.

The wood predominently used for this purpose is hickory, although occasionally a mixture of hickory and certain types of other woods are employed. The common practice in barbecuing meats is to burn large quantities of hickory logs and branches in a suitable stove or barbecue pit and allow the heat, smoke and vapor to contact and pervade all portions of the meat, until it is cooked and flavored to the desired extent.

While barbecued meats were originally only popular and known in those portions of the country where hickory wood was found in a natural growth, such products are now widely known and there is a substantial demand for barbecued meats and similar delicacies throughout the country. Now, except in the limited localities where there is a natural growth of hickory wood, the use of hickory logs is not economical since large quantities are usually consumed in a single operation of barbecuing.

In order to produce the largest amount of smoke and the most desirable flavors, it is necessary that the hickory wood should have the correct moisture content and it is well known that stale dry wood does not produce satisfactory results in this respect. The wood often reaches such an undesirable state when it has to be cut in its natural localities and then stored, shipped, and then put through time consuming processes of consumer distribution.

Barbecued meats have become especially popular as a delicacy in commercial culinary establishments which have neither the equipment or personnel to prepare and maintain a hickory log fire in the press of other business. Not only does the traditional method of preparing barbecued meats require constant attention and specialized equipment, but the introduction of such logs into modern aseptic commercial kitchen frequently serves to introduce insects, rodents and other unwanted fauna.

It is therefore an object of this invention to provide a means for economically producing a food flavoring smoke in a cooking chamber.

It is a further object of this invention to provide a means for producing a food flavoring smoke which is clean, compact and particularly suitable for use in the aseptic atmosphere of a modern kitchen.

It is a further object of this invention to provide a means for producing food flavoring smoke which will not deteriorate with age and will not have its quality affected by local atmospheric conditions.

It is another object of this invention to provide a compact means for producing a food flavoring smoke which has little bulk so that a large amount of such smoke producing material may be easily stored and kept immediately available.

These and other objects of my invention will be fully understood from the following detailed description of a typical preferred form and application of the invention, throughout which description reference is made to the accompanying drawings in which.

Figure 1:
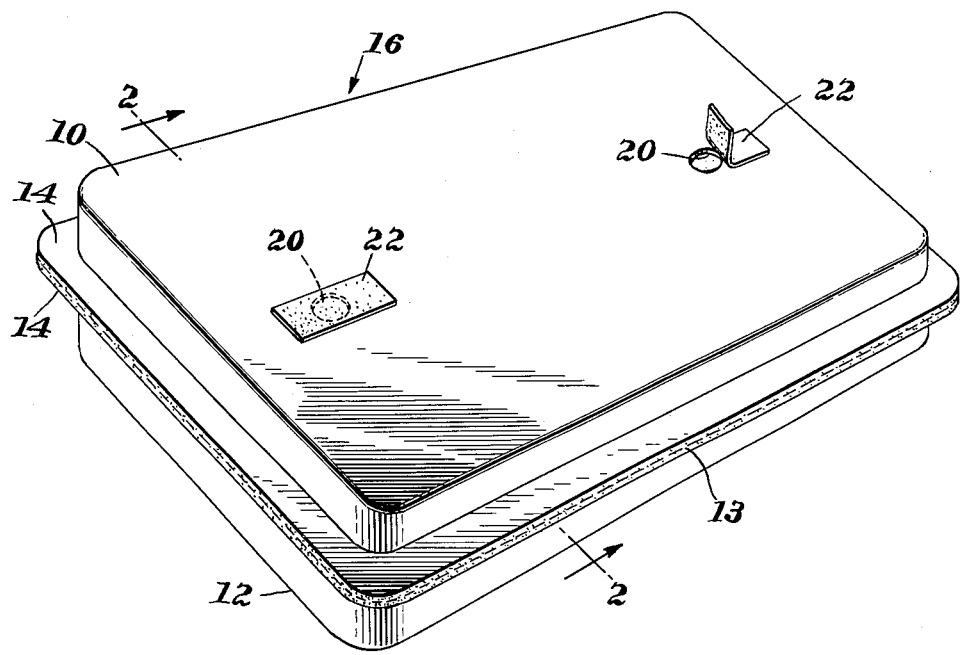
Figure 1 is a perspective view of a food flavoring, smoke producing cartridge.

Referring to the drawings, there is illustrated a food flavoring, smoke producing cartridge having a non-combustible, for example, metallic casing having top 10 and bottom 12 dish portions, each of which is provided with an outwardly extending flange or rim 14. The top and bottom portions may be substantially identical and stamped from the same die or formed to the same pattern. The flange members of the top and bottom portions are sealed together as by welding 13, soldering, or other positive means of mechanical engagement so that the two members form a tightly sealed enclosure.

Disposed within the enclosure, generally indicated at 16, is a block of material 18 adapted to produce an aromatic food flavoring smoke. This block may be formed of hickory wood, a mixture of hickory and various other types of woods, or from other material suitable for the use of providing pervasive food flavoring aromatic smoke. If the block is merely formed of hickory wood, it may consist of a mass of the wood in its natural state, or it may consist of such wood chips or small segments compressed or bound together by any suitable means. Of course, if the blocks consist of a mixture of woods, the latter type of formation will necessarily be used.

Figure 2:
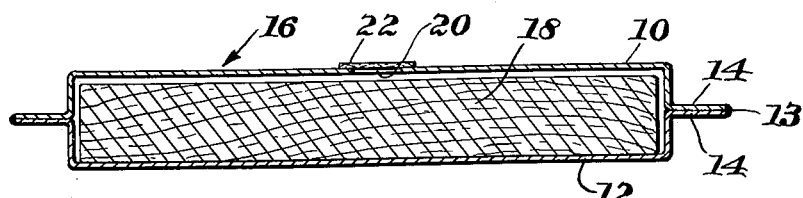
Figure 2 is a section taken along lines 2—2 of Figure 1.

As shown in Figures 1 and 2, the enclosure is provided with two small apertures 20 which may be closed with a moisture-proof closure of any suitable type. It is within the contemplation of this invention that this moisture-proof closure may consist of a pressure sensitive tape 22 which has an ignition temperature within the range of the normal cooking oven temperatures, so that the heating of the entire unit 16 to this temperature will necessarily effect the breaking or opening of this closure due to the combustion of the seal. As shown in Figure 1, the pressure sensitive tape may be manually removed just before the cartridge is inserted within the cooking chamber. It is also within the contemplation of this invention that the moisture-proof closure may consist of a piece of wax paper fixed in position by an overlay of ordinary label paper glued to the exterior surface of the enclosure 16.

The small apertures 20 are so dimensioned that the interior of the chamber formed by the enclosure 16 cannot receive sufficient oxygen to support a rapid or complete combustion of the hickory block when the unit is subjected to the normal oven temperatures usually found in barbecuing machines or commercial ovens.

It is within the contemplation of this invention that the cartridge should be placed within the cooking chamber of an automatic barbecuing machine such as disclosed in my co-pending application, Serial No. 410,586, filed February 16, 1954, now Patent No. 2,796,019. When the cartridge is disposed within such a cooking chamber and then subjected to the temperatures normally produced therein, the hickory wood, or other aromatic smoke producing material, will slowly oxidize in an incomplete combustion producing a large amount of aromatic smoke for a protracted period of time.

It has been found that such a cartridge containing a block of hickory 1" x 8" x 6" will last approximately 45 minutes and will produce an effective amount of smoke, that is, in terms of pervasion and flavoring of the meat, commensurate with the amount normally obtained by burning ten hickory logs in a conventional open barbecuing pit.

As long as the automatic barbecuing machine, oven, or other cooking chamber reaches the desired temperature, it is immaterial whether it is heated by gas, electricity, coals, or other sources of heat.

As the cartridge enclosure 16 is non-combustible, at ordinary temperatures usually found in a cooking chamber, it cannot impart any undesirable flavors or tastes to the meats being roasted therein. The pressure sensitive tapes are so small that any aroma formed by their combustion may be considered negligible.

It has been found that by the proper selection and packaging, as disclosed in this invention, of the hickory, or other products, that is, by selecting blocks having such a moisture content that they will produce an optimum amount of smoke, the total effect or utility of a particular cartridge may be calculated in terms of the mass of meat which will be suitably pervaded with the desired flavoring aroma. Such a standardization of a factor which is normally quite variable allows the commercial operator to achieve a uniformity in the quality of his barbecued product that is not otherwise obtainable. As the containers are hermetically sealed, the quality and moisture content of the cartridge can be maintained for extended periods of time so that retailers and wholesalers can maintain adequate stock of cartridges ready for use at all times.

It is also within the contemplation of this invention that the block of wood 18 may have the natural moisture content increased by a soaking process. That is, the blocks may be immersed in water for a protracted period, in which time they will take up an additional measure of moisture, over and above their natural content. It is therefore unnecessary for the manufacturer of these food flavoring cartridges to purchase or use green wood that has been freshly cut. It is entirely possible for such a manufacturer to buy scraps, ends and other forms of waste wood, and still produce a uniform product as discussed hereinabove.

It is here noted that while this invention has been illustrated and described as being provided with apertures in the top surface of the enclosure 16, it is entirely within the contemplation of this invention that some other type of opening, in some other part of the enclosure may be utilized. It is, for example, completely within the contemplation of this invention that the enclosure may be provided with slits at one or more corners, that these openings may be sealed with a removable closure or with a combustible or fusible material. While the enclosure has been illustrated as comprising twin pans or dished sections welded together, it is clear that they may be of other shapes or configurations and may be closed by any moisture-proof sealing means including combustible or fusible materials.

Figure 3:
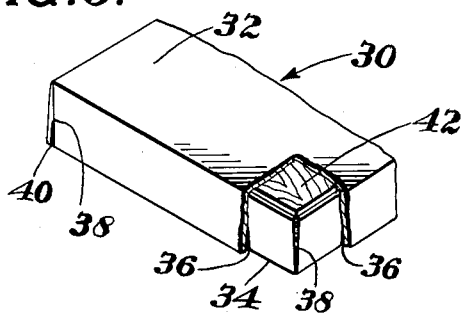
Figure 3 is a perspective view of a modified embodiment with portions broken away to more clearly illustrate the invention.

In Figure 3, an enclosure 30 is provided with top 32 and bottom 34 pans which are sealed, at 36, with a fusible moisture-proof material. The corners are provided with slits or openings 38 which may be sealed with a fusible material 40 to form a moisture-proof barrier. When this embodiment is placed within a heated cooking chamber, the fusible materials 36 and 40 will melt and will then allow the food flavoring material 42 to smolder in an incomplete combustion as discussed hereinabove.

Having described only a typical preferred form and application of my invention, I do not wish to be limited or restricted to specific details herein set forth but wish to reserve to myself any variations or modifications that may appear to those skilled in the art and falling within the scope of the following claim.

I claim:

A unitary self-contained article for producing food pervading and flavoring smoke entirely within a cooking chamber comprising a hermetically sealed metallic enclosure containing a material capable of distilling to produce an aromatic food flavoring smoke at cooking temperature, said material comprising hickory wood, said enclosure defining an aperture therein, the aperture being sufficiently small relative to the bulk of said smoke producing material to so limit the entry of oxygen into the enclosure that said material will, at cooking temperature, oxidize at a low speed and at such an air fuel combustion ratio as to produce a large amount of food pervading and flavoring smoke for a protracted period of time, a moisture-proof closure for sealing said aperture, the material of said closure being heat disintegrable at a temperature lower than cooking temperature, but at a temperature above room temperature.

References Cited in the file of this patent

UNITED STATES PATENTS

| | | |
|---|---|---|
| 207,268 | Goodin | Aug. 20, 1878 |
| 1,336,557 | Benner et al. | Apr. 13, 1920 |
| 1,961,364 | Hunter | June 5, 1934 |
| 2,168,388 | Bemis | Aug. 8, 1939 |
| 2,417,592 | Dwyer | Mar. 18, 1947 |
| 2,546,964 | Blackford | Apr. 3, 1951 |
| 2,695,207 | Windsor | Nov. 23, 1954 |

FOREIGN PATENTS

| | | |
|---|---|---|
| 496,727 | Germany | Oct. 27, 1930 |